United States Patent
Hsieh et al.

(10) Patent No.: US 8,061,849 B2
(45) Date of Patent: Nov. 22, 2011

(54) LENS MODULE HAVING THERMAL DISSIPATION STRUCTURE WITH VAULTED CONTACTING BLOCK AND PROJECTOR USING SAME

(75) Inventors: Yi-Ping Hsieh, Taipei Hsien (TW); Chien-Fu Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 481 days.

(21) Appl. No.: 12/344,263

(22) Filed: Dec. 25, 2008

(65) Prior Publication Data

US 2010/0097579 A1    Apr. 22, 2010

(30) Foreign Application Priority Data

Oct. 16, 2008   (CN) .......................... 2008 1 0304948

(51) Int. Cl.
G03B 21/16    (2006.01)

(52) U.S. Cl. ........... 353/52; 353/100; 257/706; 359/811

(58) Field of Classification Search ................. 353/52, 353/56, 100, 119; 257/706, 717; 372/36; 165/80.3, 182; 348/771; 362/382; 359/390, 359/462, 464, 465, 478, 811
See application file for complete search history.

(56) References Cited

U.S. PATENT DOCUMENTS

| 2005/0012905 A1* | 1/2005 | Morinaga ........................ 353/58 |
| 2005/0213059 A1 | 9/2005 | Liu et al. |
| 2006/0285226 A1* | 12/2006 | Senba et al. .................. 359/694 |

FOREIGN PATENT DOCUMENTS

JP    2006-139022 A    6/2006

* cited by examiner

*Primary Examiner* — Francis M Legasse, Jr.
(74) *Attorney, Agent, or Firm* — Altis Law Group, Inc.

(57) ABSTRACT

A lens module includes a seat, a lens holder and a thermal dissipation structure. The seat includes a base plate and two sidewalls perpendicularly formed on a surface of the base plate. The lens holder is mounted on the seat between the two sidewalls. The thermal dissipation structure is mounted on the seat and thermally conducts with the lens holder for cooling the lens holder.

18 Claims, 5 Drawing Sheets

LENS MODULE HAVING THERMAL DISSIPATION STRUCTURE WITH VAULTED CONTACTING BLOCK AND PROJECTOR USING SAME

BACKGROUND

1. Technical Field

The disclosure relates to lens module of a projector and, particularly, to a lens module having a thermal dissipation structure and a projector using the same, which can effectively disperse the heat of the lens module and make it work in a proper temperature.

2. Description of the Related Art

Lens modules are important and essential optical elements used in projectors for modulating light beams emitted from projection lamps and projecting them as a viewable image on a screen. However, when a projector is in operation, heat produced by the lamp raises the temperature inside the projector. If the temperature inside the projector exceeds a critical degree lens holder holding the lens module may be damaged. As a result, the image projected may be deformed and distorted.

Therefore, it is desirable to provide a lens module having a thermal dissipation structure and a projector using the same which can overcome the abovementioned problems.

DETAILED DESCRIPTION OF THE PREFERRED EMBODIMENTS

Figure 1:
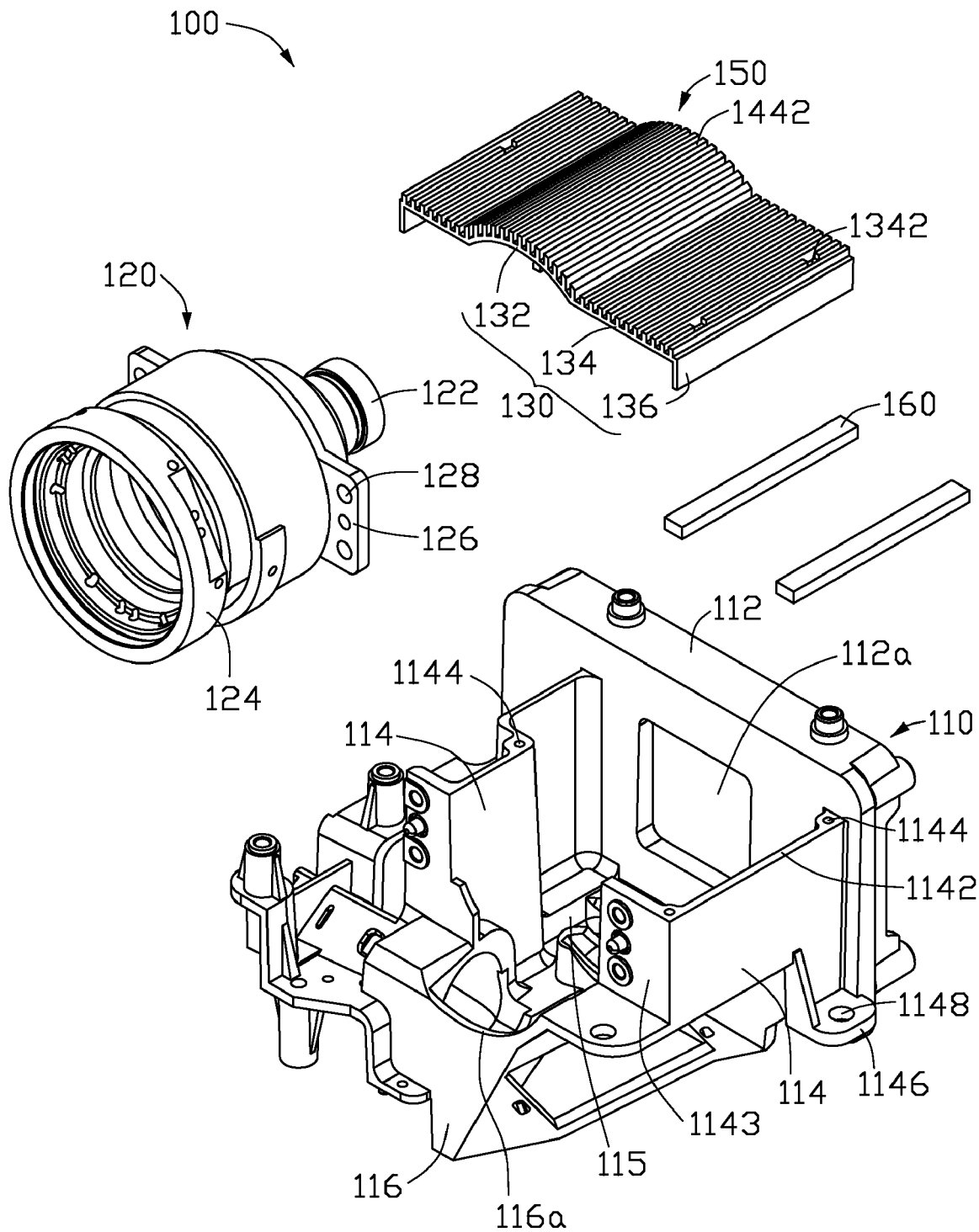
FIG. 1 is an isometric, exploded view of a lens module with a thermal dissipation structure according to a first exemplary embodiment.

Referring to FIG. 1, a lens module having a thermal dissipation structure 100 according to a fist exemplary embodiment includes a seat 110, a lens holder 120, and a thermal dissipation structure 150. The seat 110 defines a receiving room 115 for accommodating the lens holder 120. The lens holder 120 is received in the receiving room 112 of the seat 110 and fixed therein. The thermal dissipation structure 150 is mounted on the seat 110 and thermally contacts the lens holder 120 for cooling the lens holder 120.

The seat 110 includes a base plate 112 and two side walls 114 perpendicularly formed on a surface of the base plate 112. The base plate 112 is configured for supporting a DMD (Digital micromirror device) and defines a window 112a corresponding to the DMD for light passing therethrough. The two sidewalls 114 having predetermined thickness are separately formed on the surface of base plate 112. On the upper terminals 1142 of the sidewalls 114, a number of threaded holes 1144 are formed for receiving bolts (not shown) to fix the thermal dissipation structure 150 on the seat 110. At least one first lug 1146 having a through hole 1148 defined thereon is protruded outward from a low edge of the sidewall 114 for mounting the lens module 100 in a projector by corresponding bolts (not shown). Two supporting plates 1143, configured for supporting the lens holder 120, are respectively formed on the sidewalls 114 in parallel with but away from the base plate 112. In addition, a light guiding portion 116, configured for guiding the light emitted by a lamp of the projector travelling to the DMD, is formed on the under side of the sidewalls 114. The base plate 112 cooperates with the sidewalls 114 and the guiding portion 116 to form the receiving room 115 for accommodating a portion of the lens holder 120. Understandably, a groove 116a is defined in the guiding portion 116 for receiving a portion of the lens holder 120 therein, thereby allowing for a more compact lens module 100.

The lens holder 120 includes a front lens holder unit 122, a back lens holder unit 124, and a connecting portion (not labeled) connecting the front and back lens holder units 122, 124 to each other. Two second lugs 126, each having a number of through holes 128 defined therein for bolts passing therethrough to fix the lens holder 120 on the supporting plates 1143 of the seat 110, are symmetrically protruded outward from two opposite sides of the connecting portion.

Figure 2:
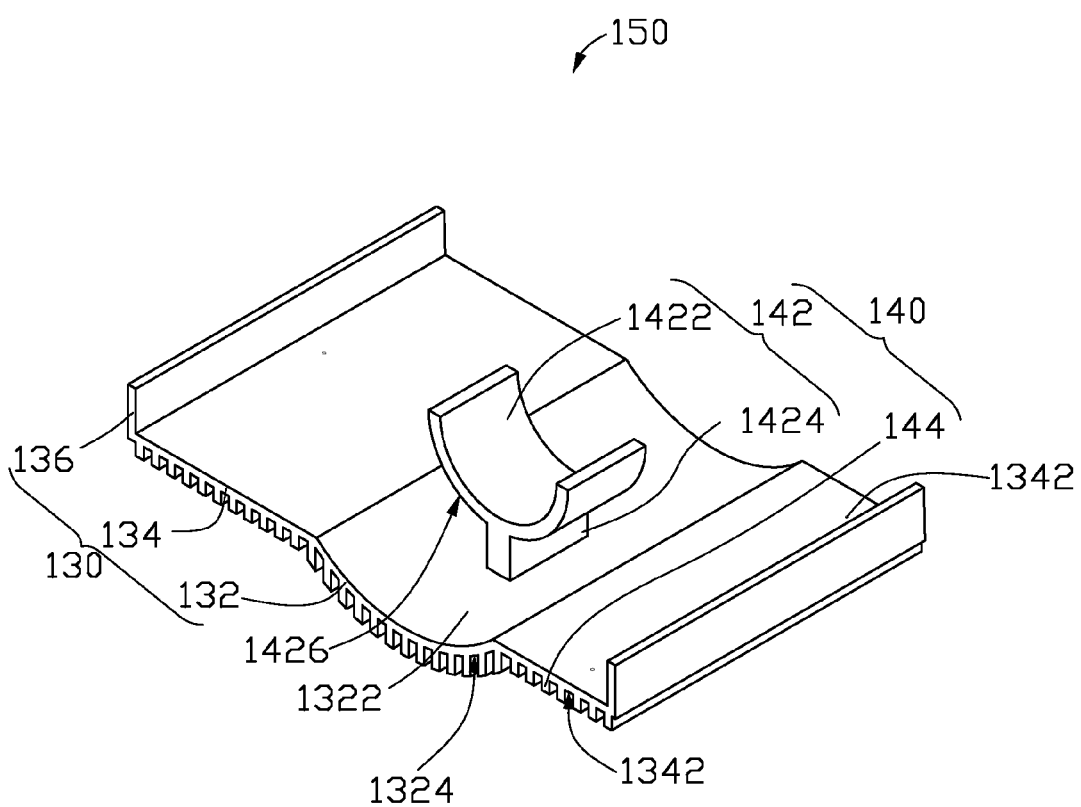
FIG. 2 is an isometric, exploded view of the thermal dissipation structure of FIG. 1 viewed from another perspective.

Referring to FIG. 2, the thermal dissipation structure 150 includes a base 130 and a cooling structure 140 formed on the base 130. The base 130 includes a middle board 132 and two sub-boards 134 symmetrically connected to the two opposite ends of the middle board 132. The middle board 132 is shaped as a cambered board according with the profile of the outside surface of the lens holder 120 for providing space between the base 130 and the lens holder 120 to permit easy assembling of the base 130 and the seat 110. The sub-boards 134 each define at least one fixing hole 1342 corresponding to the threaded holes 1144 of the seat 110 for the corresponding bolts passing therethrough to fix the base 130 on the seat 110. Two wings 136 are separately and perpendicularly extend from the free ends of the sub-boards 134 for firmly positioning the base 130 on the seat 110.

The cooling structure 140 includes a heat conducting portion 142 and a heat dispersing portion 144, which are respectively mounted on two opposite surfaces of the base 130 for cooling the lens holder 120. The heat conducting portion 142 includes a vaulted contacting block 1422 and a holding pole 1424. One end of the holding pole 1424 is attached on the extrados 1426 of the vaulted contacting block 1422, and the other end is connected on the intrados 1322 of the cambered middle board 132. The contacting block 1422 can properly match the outer surface of the front lens holder unit 122 of the lens holder 120 for conducting and transferring heat of the lens holder 120 effectively. The contacting block 1422 and the holding pole 1424 of the conducting portion 142 are all made of thermally conductive materials. The heat dispersing portion 144 comprises a number of fin-like protrusions which are arrayed and are distributed on the extrados 1324 of the middle board 132 forming a heat sink to quickly and effectively disperse the heat transferred from the heat conducting portion 142. In addition, the outer surfaces 1342 of the sub-boards 134, connecting to the extrados 1324 of the middle 132, are also covered by the fin-like protrusions of the dispersing portion 144 for improving heat dissipation rate.

In assembling the lens module 100, the lens holder 120 is mounted on the seat 110 by fixing the second lugs 126 of the lens holder 120 on the supporting plate 1143 of the seat 110 via bolts (not shown). The front lens holder unit 122 of the lens holder 120 is received in the receiving room 115 and the back lens holder unit 124 is positioned in the groove 116a of the light guiding portion 116. The base 130 of the thermal dissipation structure 150 is mounted on the sidewalls 114 of the seat 110 with the wings 136 of the base 130 clamping the side walls 114 for stably locating the base 130. While, the cooling structure 140 mounted on the base 130 contacts the outer surface of front lens holder unit 122 via the contacting block 1422. Such that, the thermal dissipation structure 150 is arranged in thermally contacting with the lens holder 120.

In use, lamp light is guided by the light guiding portion 116 to project onto the DMD. Then, the light is reflected into the front lens holder unit 122 of the lens holder 120 and emitted from the back lens holder unit 124 and projected on a screen to form a viewable image. Any heat from the light absorbed by the front lens holder unit 122 in the receiving room 115 is conducted to the holding pole 1424 by the contacting block 1422. The heat is then transferred from the holding pole 1424 to the middle board 132 and the sub-boards 134. Finally, the heat is dispersed by the heat sinks 1442 distributed on the middle board 1342 and the sub-boards 1344. Therefore, the heat of the front lens holder unit 122 can be quickly and effectively dispersed by the thermal dissipation structure 150. As a result, the front lens holder unit 122 will not be easily damaged if there is excessive heat from the projector lamp.

Understandably, to increase the thermal energy dispersing rate and ensure optimal thermal contact, a number of thermally conductive elements 160 such as thermally conductive grease can be employed to mount between the lens holder 120 and the contacting block 1422 of the cooling device 140 and/or mount between the base 130 and the side wall 114 of the seat 110.

Figure 3:
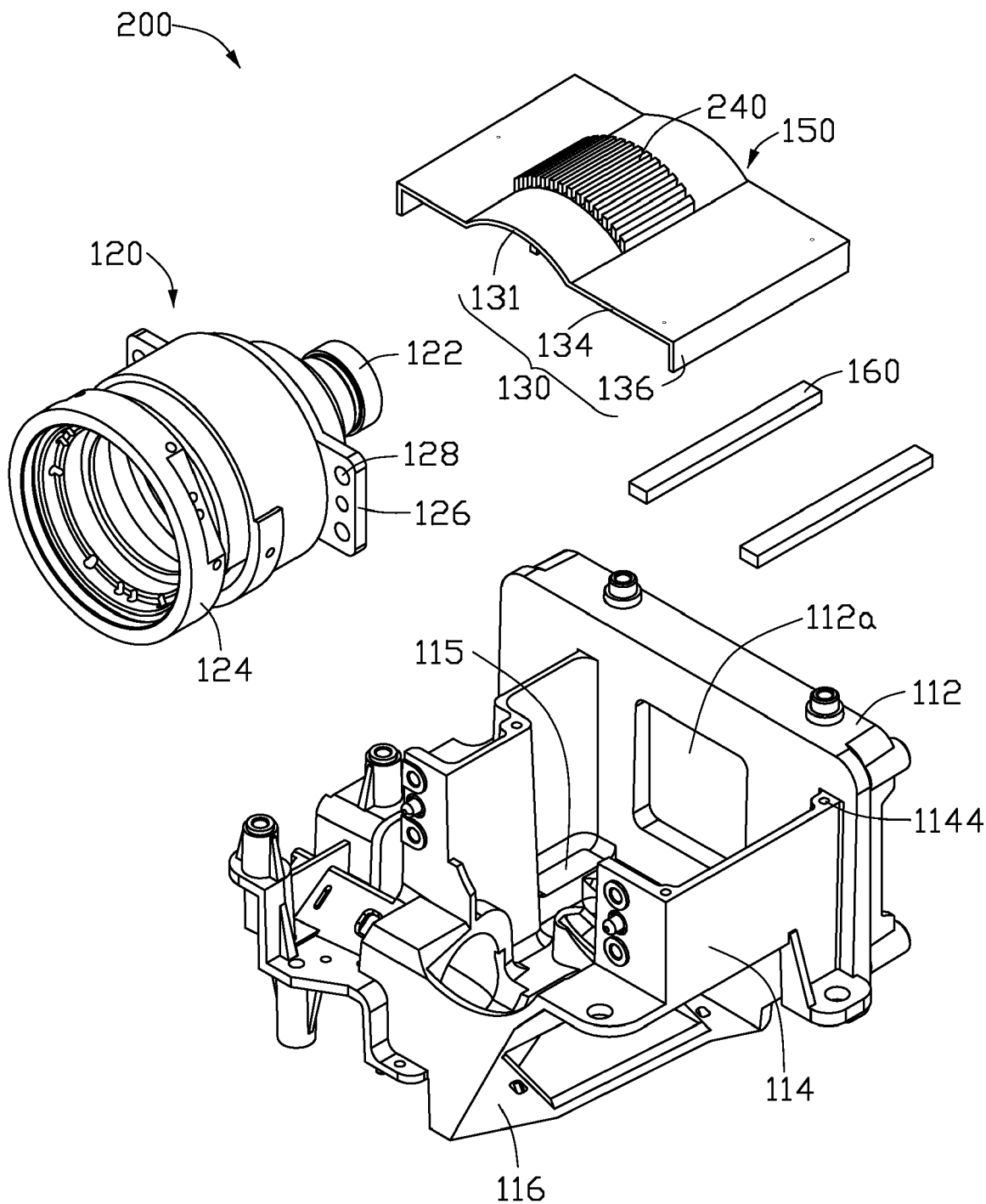
FIG. 3 is an isometric, exploded view of a lens module with a thermal dissipation structure according to a second exemplary embodiment.
Figure 4:
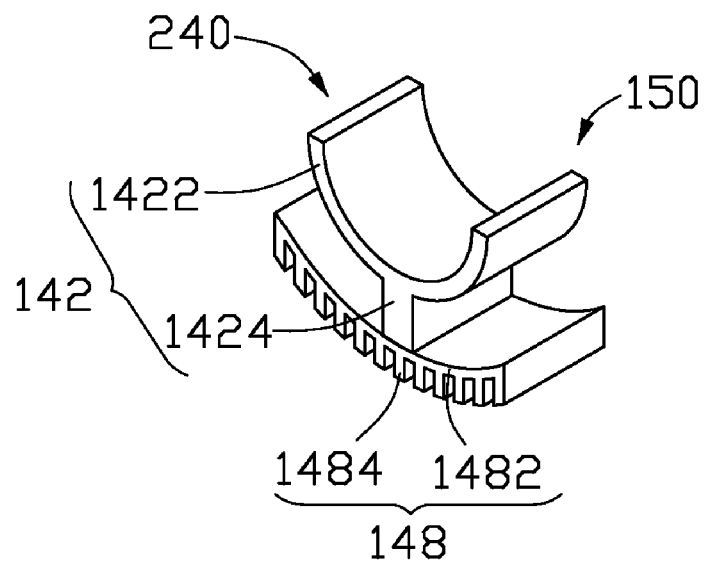
FIG. 4 is an isometric, exploded view of the thermal dissipation structure of FIG. 3 viewed from another perspective.
Figure 4:
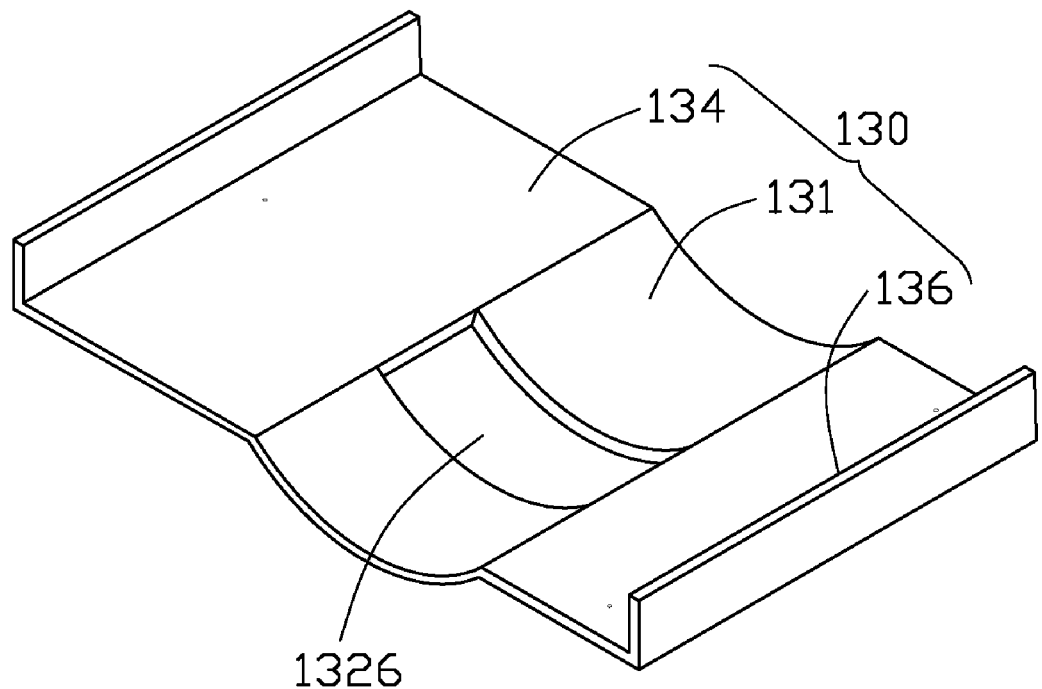

Referring to FIGS. 3 and 4, a lens module having a thermal dissipation structure 200 according to a second exemplary embodiment of the disclosure is shown. The essential difference between the lens module 200 and the lens module 100 is that the heat dispersing portion of the cooling structure 240 in the lens module 200 is a heat sink 148 having a base board 1482 and an array of fin-like protrusions 1484 distributed on a surface of the base board 1482 to increase the heat sink's surface area contacting the air for increasing the heat dissipation rate. The holding pole 1424 of the heat conducting portion 142 is connected on the basic board 1482 of the heat sink 148. The middle board 131 of the base 130 defines a window 1326 for the heat sink 148 passing there-through and being fixed therein via adhesive affixing the base board 1482 to the sidewalls (not label) surrounding the window 1326 of the base 130.

Figure 5:
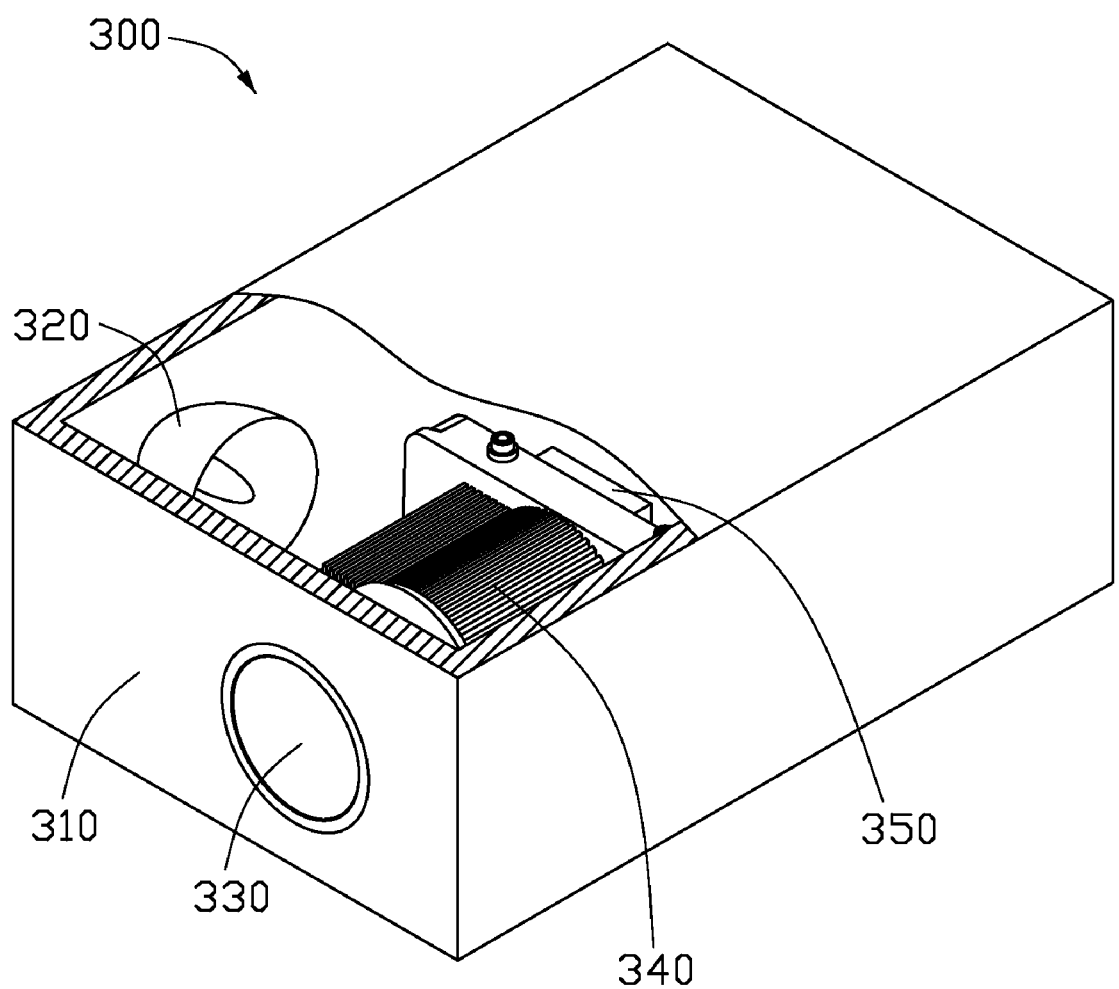
FIG. 5 is an isometric, cutaway view of a projector using the lens module of FIG. 1 in accordance with an embodiment.

Referring to FIG. 5, a projector 300 using the lens module 100 above described is shown. The projector 300 includes a case 310, a lamp 320 mounted in the case 310, a number of lenses 330, a lens module 340 mounted in the case 310 and receiving the lenses 330 therein, and a DMD 350 mounted on the lens thermal dissipation structure 340. During operation, the light emitted from the lamp 320 is guided to project onto the DMD 350, and reflected by the DMD 350, then emits from the lens holder of the lens module 340. The lenses 330 received in the lens thermal dissipation structure 340 can be cooled and work stably.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A lens module comprising:
   a seat comprising a base plate and two sidewalls perpendicularly formed on a surface of the base plate;
   a lens holder mounted on the seat between the two side walls, the profile of the outer surface of the lens holder being vaulted; and
   a thermal dissipation structure comprising a base mounted on the seat and a cooling structure mounted on the base, the cooling structure comprising a heat conducting portion and a heat dispersing portion connected to the heat conducting portion, the heat conducting portion comprising a contacting block contacting with the lens holder, the contacting block shaped as a vaulted body according to the profile of an outer surface of the lens holder.

2. The lens module as claimed in claim 1, wherein the dispersing portion is mounted on the base.

3. The lens module as claimed in claim 2, wherein the heat conducting portion and the heat dispersing portion is jointed each other, and the heat conducting portion further comprises a hold pole connected on the contacting block by one end, another end of the hold pole is mounted on the base.

4. The lens module as claimed in claim 2, wherein the heat conducting portion further comprises a hold pole connected on the contacting block by one end, another end of the hold pole is mounted on the heat dispersing portion.

5. The lens module as claimed in claim 2, wherein the seat further includes a light guiding portion formed on the under side of the sidewalls, the base plate cooperates with the sidewalls and the guiding portion to form a receiving room for accommodating a portion of the lens holder.

6. The lens module as claimed in claim 3, wherein the heat dispersing portion includes a plurality of fin-like protrusions distributed on a surface of the base facing away from the lens holder.

7. The lens module as claimed in claim 3, further comprising a thermally conducting element positioned between the contacting block of the cooling structure and the lens holder.

8. The lens module as claimed in claim 3, further comprising a plurality of thermally conducting elements positioned between the side walls of the seat and the base.

9. The lens module as claimed in claim 6, wherein the fin-like protrusions are arrayed.

10. The lens module as claimed in claim 6, wherein the base includes a middle board and two sub-boards symmetrically connected to the two opposite ends of the middle board, the fin-like protrusions are arrayed and are distributed on the surface of the middle board.

11. The lens module as claimed in claim 4, wherein the heat dispersing portion is a heat sink having a basic board and an array of fin-like protrusions distributed on a surface of the basic board facing away from the lens holder, the holding pole is connected on the basic board of the heat dispersing portion.

12. The lens module as claimed in claim 4, further comprising a thermally conducting element positioned between the contacting block of the cooling structure and the lens holder.

13. The lens module as claimed in claim 4, further comprising a plurality of thermally conducting elements positioned between the sidewalls of the seat and the base.

14. The lens module as claimed in claim 11, wherein the base includes a middle board and two sub-boards symmetrically connected to the two opposite ends of the middle board, the middle board defines a window thereon for the heat sink of the cooling structure passing therethrough and being fixed therein via an adhesive.

15. The lens module as claimed in claim 10, wherein the fin-like protrusions are further distributed on the outer surface of the sub-boards.

16. The lens module as claimed in claim 10, wherein the profile of the outer surface of the lens holder is cambered and the middle board of the base is cambered shaped according the profile of the outside surface of the lens holder.

17. The lens module as claimed in claim 10, wherein the base further comprises two wings separately and perpendicularly extend from the free ends of the sub-boards, the wings clamp the two side wall of the seat.

18. A projector comprising:

a case;

a lamp mounted in the case;

a lens module comprising:

a seat comprising a base plate and two sidewalls perpendicularly formed on a surface of the base plate;

a lens holder mounted on the seat between the two side walls, the profile of the outer surface of the lens holder being vaulted; and a thermal dissipation structure comprising a base mounted on the seat and a cooling structure mounted on the base, the cooling structure comprising a heat conducting portion and a heat dispersing portion connected to the heat conducting portion, the heat conducting portion comprising a contacting block contacting with the lens holder, the contacting block shaped as a vaulted body according to the profile of an outer surface of the lens holder;

a lens received in the lens holder of the lens module; and a DMD mounted on the seat for reflecting the light emitted by the lamp to the lenses received in the lens holder.

* * * * *